United States Patent [19]

Yatsuzuka

[11] Patent Number: 4,829,413
[45] Date of Patent: May 9, 1989

[54] CONVERTER CIRCUIT

[75] Inventor: Yasuhumi Yatsuzuka, Yamatokoriyama, Japan

[73] Assignee: Sharp Kabushiki Kaisha, Osaka, Japan

[21] Appl. No.: 253,324

[22] Filed: Oct. 3, 1988

Related U.S. Application Data

[63] Continuation of Ser. No. 909,471, Sep. 19, 1986, abandoned.

[30] Foreign Application Priority Data

Sep. 20, 1985 [JP] Japan .................................. 60-209093

[51] Int. Cl.⁴ ............................................ H02M 3/335
[52] U.S. Cl. ........................................... 363/19; 363/49
[58] Field of Search ........................ 363/18, 19, 20, 21, 363/49; 323/299, 901, 908

[56] References Cited

U.S. PATENT DOCUMENTS

| 3,299,347 | 1/1967 | Torii ..................................... 323/901 |
| 3,898,593 | 8/1975 | Qureshi ........................... 323/354 X |
| 4,172,276 | 10/1979 | Kameya . |
| 4,236,198 | 11/1980 | Ohsawa et al. ...................... 363/49 |

FOREIGN PATENT DOCUMENTS

| 266262 | 11/1968 | Austria .. |
| 2751578 | 5/1978 | Fed. Rep. of Germany . |
| 3218357 | 11/1983 | Fed. Rep. of Germany ........ 363/49 |
| 1457883 | 5/1978 | United Kingdom . |

Primary Examiner—Peter S. Wong
Attorney, Agent, or Firm—Birch, Stewart, Kolasch & Birch

[57] ABSTRACT

A converter circuit with an oscillation transistor is provided with a circuit for changing starting resistance for the oscillation transistor to develop a fixed A.C. output voltage on the secondary side of the transformer from input voltages on the primary side thereof.

12 Claims, 2 Drawing Sheets

CONVERTER CIRCUIT

BACKGROUND OF THE INVENTION

This application is a continuation of application Ser. No. 909,471, filed on Sept. 19, 1986, now abandoned.

The present invention relates to a converter circuit providing an A.C. voltage on the secondary side.

When a circuit is constructed so that an A.C. voltage may be obtained from the secondary side of a converter circuit (DC-DC converter circuit), the secondary A.C. voltage varies virtually in proportion to the input voltage on the primary side which varies.

Therefore, the circuit of the prior art has such a disadvantage that a necessary voltage was only obtained from one point (having a width of several voltages) of the primary input voltage.

More particularly, in a prior art converter circuit as shown in FIG. 4, the output voltage $V'_f$ of the coil $L_3$ is determined virtually by the ratio of number of turns of the coil $L_3$ to that of the coil $L_1$ and the input voltage $V'_{in}$. Hence, as the input voltage $V'_{in}$ is increased, the output voltage $V'_f$ becomes higher according to the input voltage $V'_{in}$ as shown in FIG. 5.

For the above described reason, in designing a converter circuit, once a set value $V'_s$ of the output voltage is established for a typical (Typ) $V'_1$ of the input voltage, then, for another typical value $V'_2$ of the input voltage, the output voltage $V_x$ greatly deviates from the set value $V'_s$.

SUMMARY OF THE INVENTION

With the foregoing in view a primary object of the present invention is the provision of a converter circuit which develop a single output voltage at the secondary side of the transformer even if a plurality of input voltages are applied on the primary side.

Briefly described, in accordance with the present invention, a converter circuit with an oscillation transistor is provided which comprises means for changing starting resistance for the oscillation transistor, whereby a fixed A.C. voltage is obtainable on the secondary side from input voltages on the primary side.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Construction of the present invention will be described referring to an embodiment.

Figure 1:
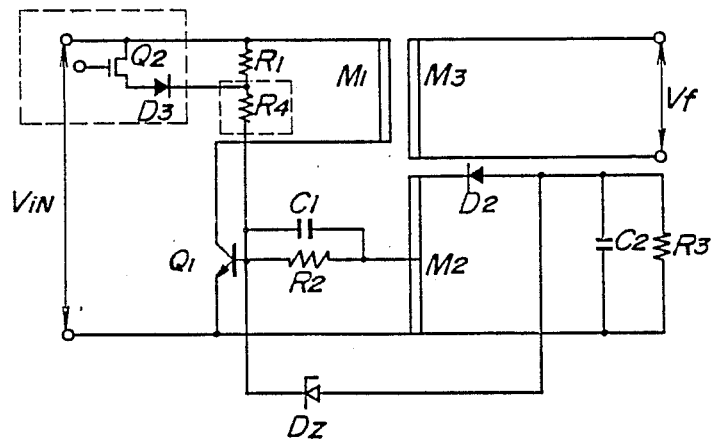
FIG. 1 is a constructional drawing of a converter circuit according to an embodiment of the present invention.

FIG. 1 shows construction of a converter circuit according to the embodiment of the invention.

Referring to the drawing, $Q_1$ denotes a switching (oscillation) transistor of the junction type, $R_1$ and $R_4$ denote starting current limiting resistors for the mentioned switching transistor $Q_1$, $R_2$ denotes a drive current limiting transistor, $C_1$ denotes a capacitor for speeding up the switching operation of the switching transistor $Q_1$, $D_2$ denotes a rectifying diode, $D_z$ denotes a Zener diode for voltage regulation, $C_2$ denotes a smoothing capacitor, $R_3$ denotes a dummy load, and $M_1$, $M_2$, and $M_3$ denote coils.

And, in the present embodiment, there are provided a transistor $Q_2$ of the field effect transistor (FET) type for selecting the starting resistance for the mentioned switching transistor $Q_1$ and a diode $D_3$ for protecting the transistor $Q_2$.

The present converter circuit is to provide an output voltage Vf when an input voltage Vin is given, and the output voltage Vf is decided virtually by the input voltage Vin and the ratio of the number of turns of the coil $M_1$ to the number of turns of the coil $M_3$.

In the present embodiment, it is arranged such that, when the input voltage Vin is changed, selection is made to the side of the circuit enclosed by the broken line under control of a control portion not shown, and thereby, the starting resistor for the switching transistor $Q_1$ is switched from $R_4$ to $R_1 + R_4$. It is also possible to enable selection among three or more resistance values by increasing the number of the resistors.

Figure 2:
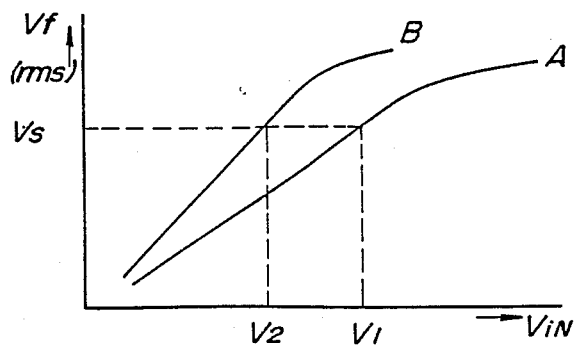
FIG. 2 is a graph of characteristic curves between input and output voltages of the circuit.

Referring now to FIG. 2, wherein a state in which the input voltage Vin is high is indicated by the curve A and the state in which the input voltage Vin is low is indicated by the curve B, in order to bring the output voltage to one and the same set value $V_s$ for both the input voltage $V_1$ on the curve A and the input voltage $V_2$ on the curve B, the starting resistance determining the operating point of the switching transistor $Q_1$ is selected to be of the value suited for either one of the above mentioned states.

More concretely, in the state of the curve A, the bias of the base of the switching transistor $Q_1$ is controlled to become the optimum value by $$(R_1 + R_4) : R_2,$$

and in the state of the curve B, the bias of the switching transistor $Q_1$ is controlled to become the optimum value by $$R_4 : R_2.$$

The reason why the input-output characteristics as shown in FIG. 2 are obtained is that, in the state of the curve B, as compared with the state of the curve A, OFF time of the switching transistor $Q_1$ is made shorter, as well as the rise time from OFF to ON is decreased, and rate of change of current di/dt is thereby increased, and hence, the induced voltage on the secondary side in the state of the curve B is increased more than that in the state of the curve A.

Thus, a constant output voltage $V_s$ is maintained by using the voltage characteristic of the curve A when the input voltage is $V_1$ and using the voltage characteristic of the curve B when the input voltage is $V_2$.

Figure 3:
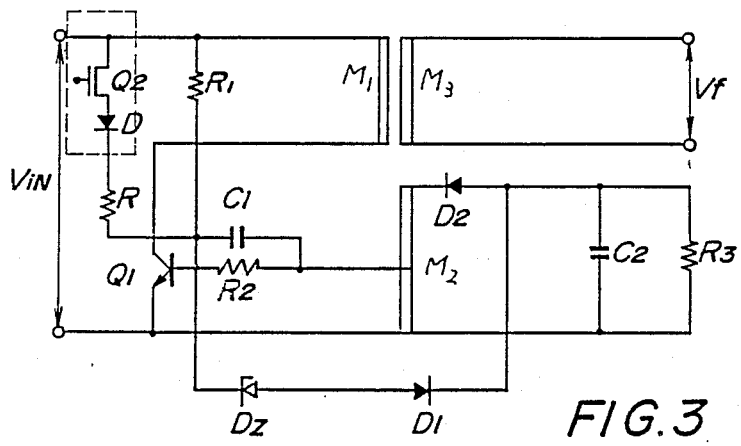
FIG. 3 is a constructional drawing of a converter circuit according to another embodiment of the present invention.
Figure 4:
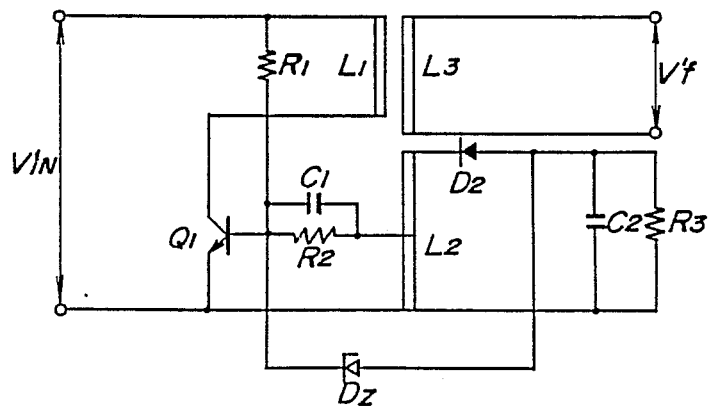
FIGS. 4 and 5 are drawings for explanation of a prior art converter circuit.
Figure 5:
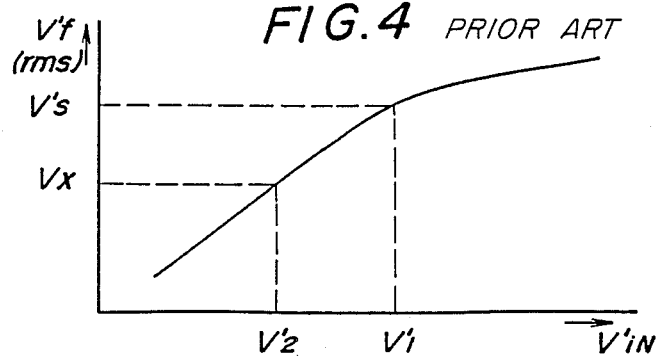

Another embodiment of the invention is shown in FIG. 3. Reference numerals in FIG. 3 are equivalent to those in FIG. 1. $D_1$ denotes a diode.

Although the manner of interconnection therein is different from the previously described embodiment, the technique to change the starting resistance for the switching transistor $Q_1$, and thereby to obatin a fixed A.C. voltage (set value) on the secondary side from the input voltages Vin on the primary side is embodied in the present drawing.

In constructing a circuit in practice, of course, it is a good way to select either the first embodiment or the second embodiment in view of the merit in actual mounting.

Incidentally, if the starting resistance value for the switching transistor is changed with the input voltage kept constant, then two kinds of output A.C. voltage values are obtained.

As described so far, the converter circuit of the present invention is provided with an oscillation transistor and adapted such that a fixed A.C. voltage is obtained on the secondary side from input voltages on the primary side by changing the starting resistance for the oscillation transistor, and therefore, it is possible to provide the converter circuit for enabling the A.C. output voltage at one and the same level to be obtained from the input voltages at a plurality of points, the converter circuit usable at a wide variety of the input voltages, with a small number of parts used and at a low manufacturing cost.

While only certain embodiments of the present invention have been described, it will be apparent to those skilled in the art that various changes and modifications may be made therein without departing from the spirit and scope of the present invention as claimed.

What is claimed is:

1. A converter circuit for developing a stable output voltage from an input voltage whose average voltage may vary with time, comprising:

a transformer having a primary winding, a secondary winding and a feedback winding, and developing said stable output voltage across the secondary winding;

first semiconductor switching means, connected between said transformer primary winding and said input voltage, and having a control terminal and a pair of controlled terminals for controlling switching said input voltage and applying said switching voltage to said transformer primary winding;

switch point setting means, operatively connected to the control terminal of said first semiconductor switching means, for controlling the timing of the conduction of said first semiconductor switching means to vary the amount of said input voltage supplied to said transformer primary winding, said switch point setting means further including, a resistance and a capacitance connected in parallel directly between the feedback winding and said control terminal, and a variable resistance network comprised of a plurality of resistors connected directly from said input voltage to said control terminal; and second semiconductor switching means and a protective diode therefor, said second semiconductor switching means having a control terminal and a pair of controlled terminals, said controlled terminals being connected between said input voltage and said resistance network through said protective diode, said second semiconductor switching means being rendered selectively conductive for varying the effective resistance of said resistance network to control the conduction of said first semiconductor switching means to facilitate development of said stable output voltage.

2. The circuit of claim 1 wherein said resistance network comprises first and second serially connected resistors.

3. The circuit of claim 2 wherein said second semiconductor switching means is selectively rendered conductive to remove said second resistor from the effective resistance connected to the control terminal of said first semiconductor switching means.

4. The circuit of claim 1 wherein said resistance network comprises first and second parallel connected resistors.

5. The circuit of claim 4 wherein said second semiconductor switching means is selectively rendered conductive to remove said second resistor from the effective resistance connected to the control terminal of said switching means.

6. The circuit of claim 1 wherein said stable output voltage is an A.C. voltage.

7. The circuit of claim 1 wherein said feedback winding includes end terminals and wherein said parallel resistance and capacitance are connected to the feedback winding intermediate said end terminals.

8. The circuit of claim 1 and additionally including a diode and a zener diode connected in series between one end terminal of said feedback winding and said control terminal of said first semiconductor switching means.

9. The circuit of claim 1 and additionally including a diode coupled to one end terminal of said feedback winding and a resistance and a capacitance coupled in parallel across said feedback winding through said diode.

10. The circuit of claim 1 wherein said first and second semiconductor switching menas are comprised of transistors.

11. The circuit of claim 1 wherein said first and second semiconductor switching means are respectively comprised of first and second type transistors.

12. The circuit of claim 11 wherein said first type transistor comprises a junction transistor and said second type transistor comprises a field effect transistor.

* * * * *